(12) United States Patent
Hora

(10) Patent No.: US 8,453,279 B2
(45) Date of Patent: Jun. 4, 2013

(54) UNDERCHAIR PET REST

(76) Inventor: Gregory Ronald Hora, Huntington Beach, CA (US)

(*) Notice: Subject to any disclaimer, the term of this patent is extended or adjusted under 35 U.S.C. 154(b) by 0 days.

(21) Appl. No.: 13/449,311

(22) Filed: Apr. 18, 2012

(65) Prior Publication Data
US 2012/0291198 A1 Nov. 22, 2012

Related U.S. Application Data

(60) Provisional application No. 61/519,178, filed on May 18, 2011.

(51) Int. Cl.
*A01K 29/00* (2006.01)
*A47C 7/62* (2006.01)

(52) U.S. Cl.
USPC ............. 5/122; 5/127; 119/28.5; 297/188.08; 297/188.12

(58) Field of Classification Search
USPC .................. 5/120, 122, 123, 130; 297/188.08, 297/188.12; 119/28.5; 279/188.2
See application file for complete search history.

(56) References Cited

U.S. PATENT DOCUMENTS

| | | | | |
|---|---|---|---|---|
| 1,297,431 A | * | 3/1919 | Andrew | ............ 297/188.12 |
| D127,808 S | | 11/1939 | McGillicuddy | |
| D294,752 S | | 3/1988 | Palier | |
| 5,015,033 A | * | 5/1991 | Winters | ............ 297/188.12 |
| 5,106,152 A | * | 4/1992 | Ward et al. | ............ 297/188.12 |
| D374,512 S | | 10/1996 | Kiley et al. | |
| D379,682 S | | 6/1997 | Rafaat | |
| 5,860,389 A | | 1/1999 | Caldwell | |
| D431,695 S | | 10/2000 | Burt | |
| 8,122,527 B2 | * | 2/2012 | Ruttler | ............ 4/484 |
| 2009/0045155 A1 | | 2/2009 | Howard | |
| 2011/0043007 A1 | * | 2/2011 | Jones | ............ 297/188.08 |
| 2011/0155069 A1 | | 6/2011 | Edmonds | |
| 2011/0272981 A1 | | 11/2011 | Rabson et al. | |

OTHER PUBLICATIONS

Cat Above Company, "Cat Hammocks", accessed on Sep. 24, 2012 at http://catabove.com/cathammocks.html.

* cited by examiner

*Primary Examiner* — Michael Trettel
(74) *Attorney, Agent, or Firm* — Fish and Associates, PC

(57) ABSTRACT

A sheet disposed in a chair underside and attachable to the legs of the chair is disclosed. The sheet is configured for forming a downward droop from the weight of a pet and is designed to provide a comfortable resting place for a household cat and other pets as well as provide storage for various household items. The sheet may be attached to the chair by straps connected to and protruding from the perimeter of the sheet. Stiffening bars may be used to reinforce the sides of the sheet. Flaps attached to the sheet perimeter and attachable to the seat may be used to provide a dark and concealed environment for the pet to rest.

16 Claims, 8 Drawing Sheets

UNDERCHAIR PET REST

RELATED APPLICATIONS

This application claims priority from provisional application No. 61/519,178 filed on May 18, 2011.

FIELD OF THE INVENTION

The present invention relates to a stretchable sheet such as a hammock for a chair underside configured to attach to the chair legs. The sheet may be used for holding a household pet or for storing various household items.

BACKGROUND OF THE INVENTION

Pet owners commonly purchase furniture made specifically for their pets to sleep on. A common piece of furniture for cats is the cat hammock. A typical hammock consists of a piece of fabric attached to a support frame, allowing the cat to sit comfortably on top of the fabric portion. U.S. Pat. No. D431,695 to Burt (1999) discloses the common form of cat hammock design. This form of cat hammock requires a specific support frame to be built and utilized only by the cat hammock.

Similar cat hammock designs disclosed by U.S. Pat. No. D379,682 to Rafaat (1993) and U.S. Pat. No. 5,860,389 to Caldwell (1997) and U.S. Pat. No. D127,808 to Mcgillicuddy (1941) all use the same basic design of an integral support frame. All of these designs require unique frame parts that cannot be used anywhere but the cat hammock itself.

Similar designs disclosed by U.S. Pat No. D374,512 to Kiley (1996) and U.S. Pat. No. D294,752 to Palier (1988) utilize a built in shade but still utilize the specific, required, frame to support the fabric. While the shade will give a cat some degree of comfort by allowing it to hide from the added cover, the shade does not give total overhead protection.

All of these designs require the manufacturer to use extra resources and time in order produce a specific support frame for the hammock. This results in wasted materials for the manufacturer, additional shipping requirements for the retail establishments selling the item, and additional cost to the consumer.

Additionally, a specific volume of space in the consumer's home is taken up by the required frame of the hammock. In small apartment dwellings, it is undesirable to dedicate this space to pet furniture. Designs disclosed in U.S. patent application Ser. No. 12/648,732 from Edmonds (2009) and Ser. No. 12/141,576 from Howard (2008) attempt to address the space requirements of cat hammocks. One attaches the cat hammock to a window and the other utilizes a fold-able frame. However, both designs still require the use of support frames and the frames are a higher degree of complexity over the previously mentioned designs.

One design that is currently available for sale eliminates the built in frame of the cat hammock. This design however is dependent upon a specific style of table that utilizes support pegs for the fabric to drape over. This design replaces the specific integral frame of the hammock with a specific integral table design which does not aid in minimizing complexity or cost.

Generally, the prior art pet hammock designs are deficient in a number of respects:

(a) They require a specific frame be built for the function of the hammock. Additional manufacturing steps, materials, and costs are the result of this required frame.

(b) The required support frame results in a specific volume of space being taken up by the hammock. Valuable floor space in the owner's dwelling is taken up by the previous designs.

(c) In order to clean around and under the hammock, the owner must move the entire support frame resulting in unnecessary steps.

(d) The shipping cost of the hammock to consumers is unnecessarily high due to the large required support frame.

(e) Through the uncovered design of existing hammocks, the cat is exposed without any cover while sleeping. This may be undesirable to the cat and result in limited adoption of the hammock and buyer's remorse for the consumer.

SUMMARY OF THE PRESENT INVENTION

The objects and advantages of the sheet of the present invention are as follows:

(a) The sheet design requires no integral support frame. The support for the sheet comes from the consumer's existing chair. The sheet is attached to the legs of the chair and rests beneath the chair seat. This results in lower manufacturing costs due to less complexity and lower material requirements.

(b) The sheet design does not take up any additional floor space. The existing space taken up by the chair is utilized by the sheet resulting in no additional clutter or lost space.

(c) Since the sheet is attached to the chair, a broom or vacuum can easily be moved underneath for cleaning. Since the chair would most likely be moved in the event of cleaning, an extra step of moving the sheet itself is not needed.

(d) By removing the support frame from the design, the sheet can be shipped in a smaller amount of space resulting in a cost savings to both the retailer and consumer.

(e) By attaching the sheet to a chair's legs and situating the sleeping area underneath the chair's seat, a cat will have a covering overhead. This will be desirable to the cat and result in further use of the sheet and buyer satisfaction of the consumer.

Further objects and advantages of my invention will become apparent from a consideration of the drawings and ensuing description.

In an embodiment of the present invention, a sheet for a chair underside adapted for outstretching, the chair having a first leg, a second leg, a third leg and a seat having an area and an outer perimeter, the sheet comprises an outstretched area not exceeding the seat area; an outer perimeter; a first strap having a first end and a second end, the first end of the first strap being attached to a first attaching point disposed on the outer perimeter of the sheet, the second end of the first strap being attached to the first leg of the chair; a second strap having a first end and a second end, the first end of the second strap being attached to a second attaching point disposed on the outer perimeter of the sheet the second end of the second strap being attached to the second leg of the chair; and a third strap having a first end and a second end, the first end of the third strap being attached to a third attaching point disposed on the outer perimeter of the sheet the second end of the third strap being attached to the third leg of the chair.

In another embodiment of the present invention, the chair comprises four legs, and the sheet further comprises a fourth strap having a first end and a second end, the first end of the fourth strap being attached to a fourth attaching point disposed on the outer perimeter of the sheet, the second end of the fourth strap being attached to the fourth leg of the chair.

DETAILED DESCRIPTION OF THE INVENTION

The main features and components related to the present invention are as follows:

Three Leg Chair

10. Attachment patch to support attaching the sheet to the leg
11. Sheet seating area
12. Fastening strap for attaching the sheet to the leg.
13. Chair seating area
14. Chair leg
15. Strap—leg interface and closure point

| Four leg chair |
| --- |
| 1. Chair |
| 1A. Chair Leg |
| 1B. Chair Seat |
| 2. Attachment point |
| 3. Sheet seating area |
| 4. Sheet strap |
| 5. Sheet strap interface to seating area |
| 6. Stiffening bar |
| 7. Flap |
| 8. Flap attachment point to the chair |
| 9. Flap attachment point to the sheet |
| 10 3 leg chair attachment point |

The sheet of the present invention may be attached to a chair having three or four legs.

Figure 1A:
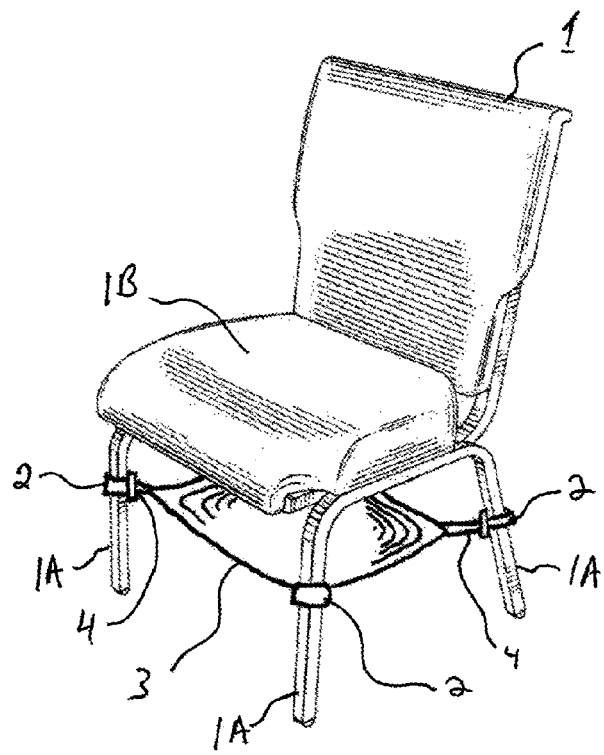
FIGS. 1A to 1C show the sheet of the present invention attached to a chair in different views.
Figure 1B:
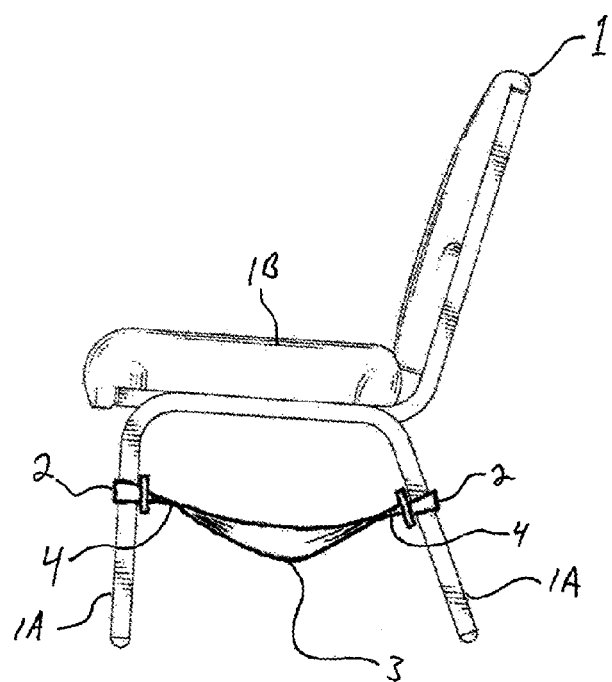
Figure 1C:
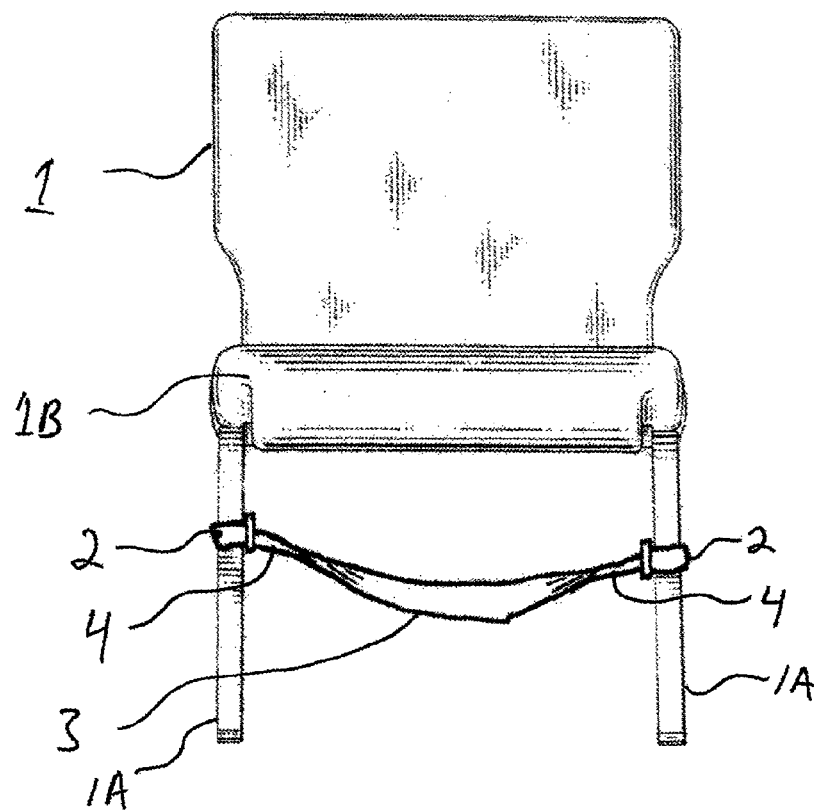

A typical embodiment of the sheet of the present invention installed on a chair having four legs is illustrated in FIG. 1A (isometric view), FIG. 1B (side view), and FIG. 1C (front view). The sheet strap 4 is attached to the chair leg 1A at four attachment points 2 on the chair. One strap will connect to one leg of the chair providing support for the sheet area 3 which may be made of fabric, plastic, wood, metal, or composites. The attachment point 2 of the sheet strap to the chair leg is accomplished by any of the following means: string, hook and loop connections, buttons, snaps, buckles, zipper, strap, magnets, hooks, or other similar devices.

Figure 2A:
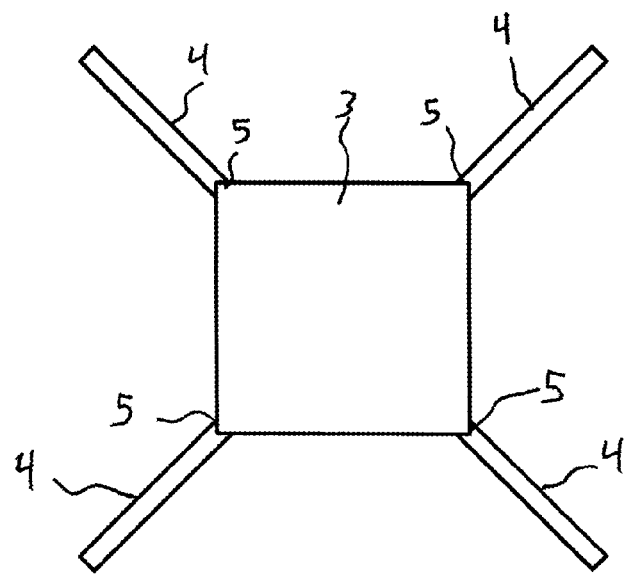
FIGS. 2A to 2C show the sheet of the present invention in standard configuration and alternative configurations with stiffening bars and side flaps.

The typical embodiment of the invention is shown by itself in the non-installed state in FIG. 2A. The sheet seating area 3 is of a size sufficient to accommodate a reclined pet. The straps 4 are shown attached to the sheet seating area at the interface point 5.

Figure 2B:
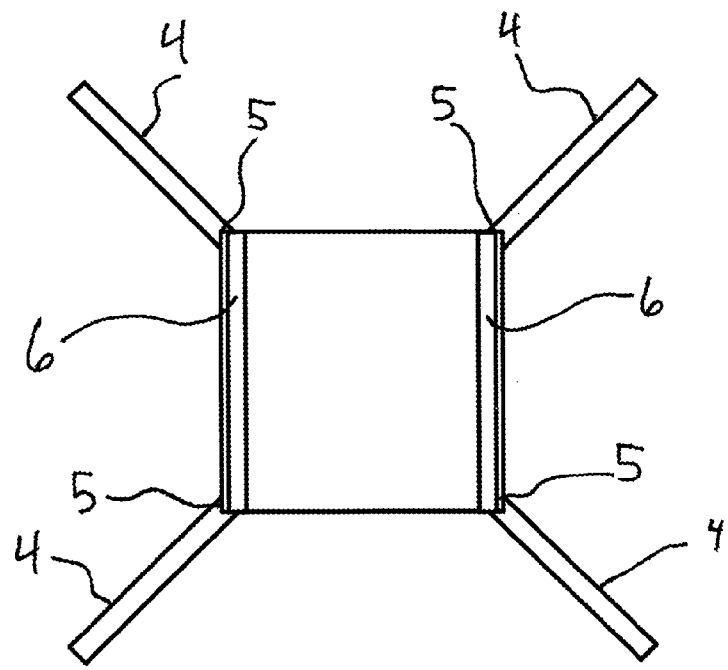
Figure 3A:
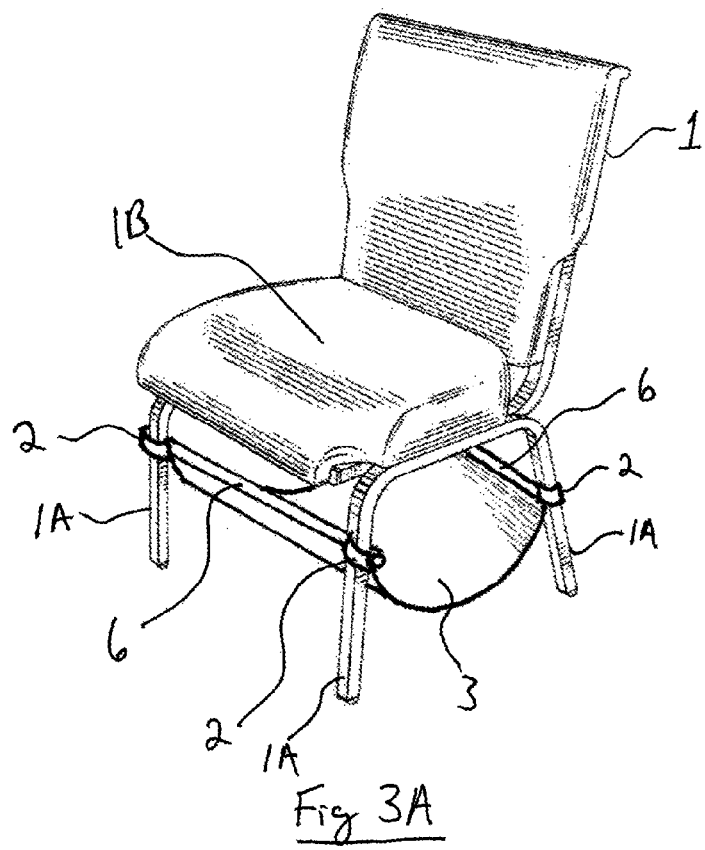
FIGS. 3A to 3C show the stiffening bar configuration of the sheet of the present invention attached to a chair in different views.
Figure 3B:
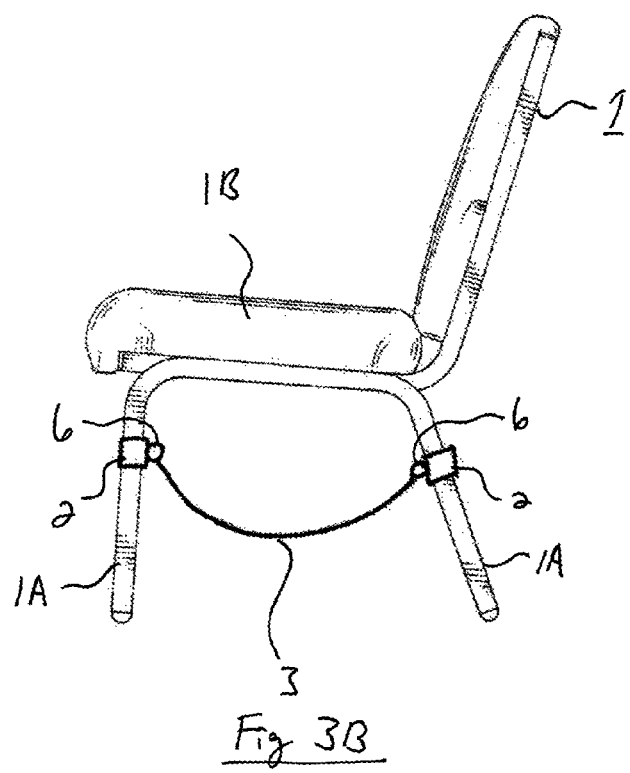
Figure 3C:
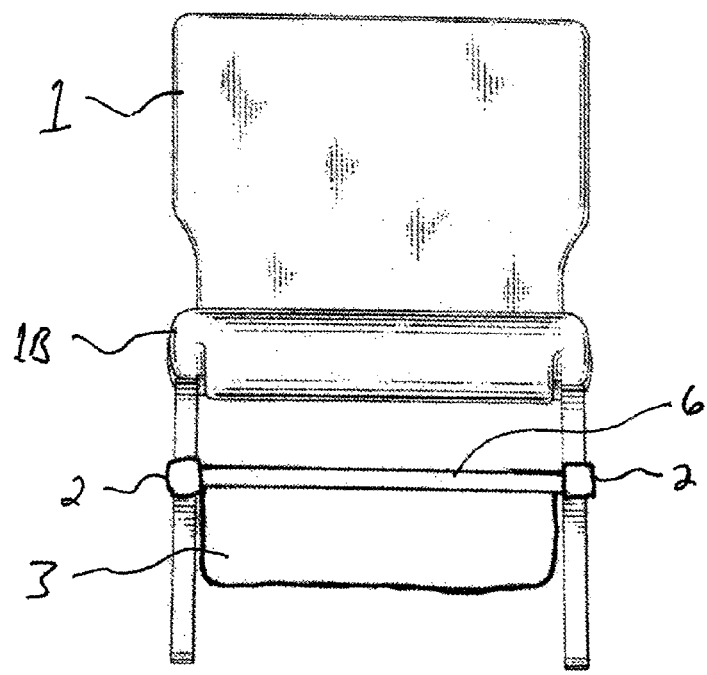

One possible alternate design that utilizes stiffening rods is shown in FIG. 2B. This configuration utilizes stiffening rods 6 attached to two opposite sides of the seating area 3. The rods are attached to the sheet on the entire length of two sides of the seating area 3. The straps 4 and interface point 5 are unchanged from the configuration shown in FIG. 2A. These stiffening rods could make it easier for a pet to enter or exit the sheet when installed. The installation of this configuration is shown on FIG. 3A (isometric view), FIG. 3B (side view) and FIG. 3C (front view). Similar to FIG. 1A-1C, the strap 4 is attached to the chair leg 1A at the attachment point 2 by any of the following means: string, hook and loop connections, buttons, snaps, buckles, zipper, strap, magnets, hooks, or other similar devices.

Figure 2C:
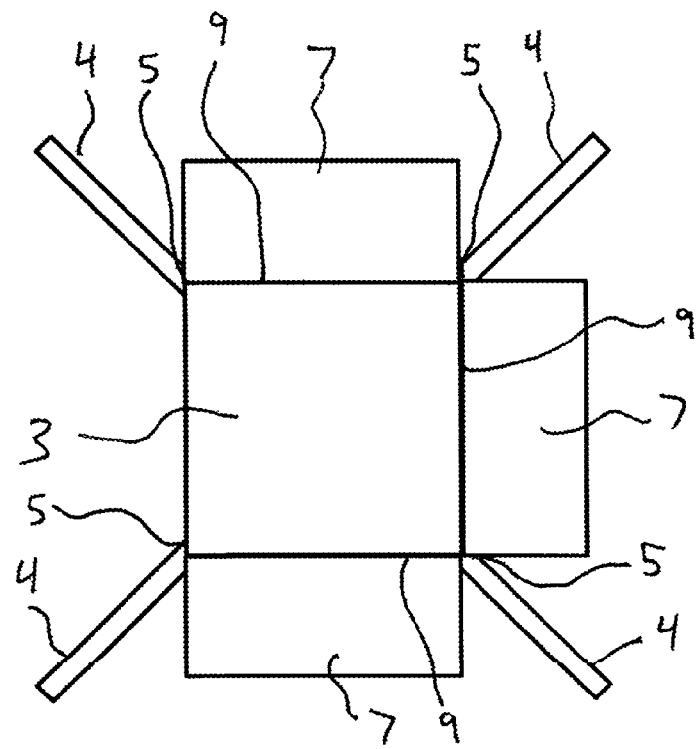
Figure 4A:
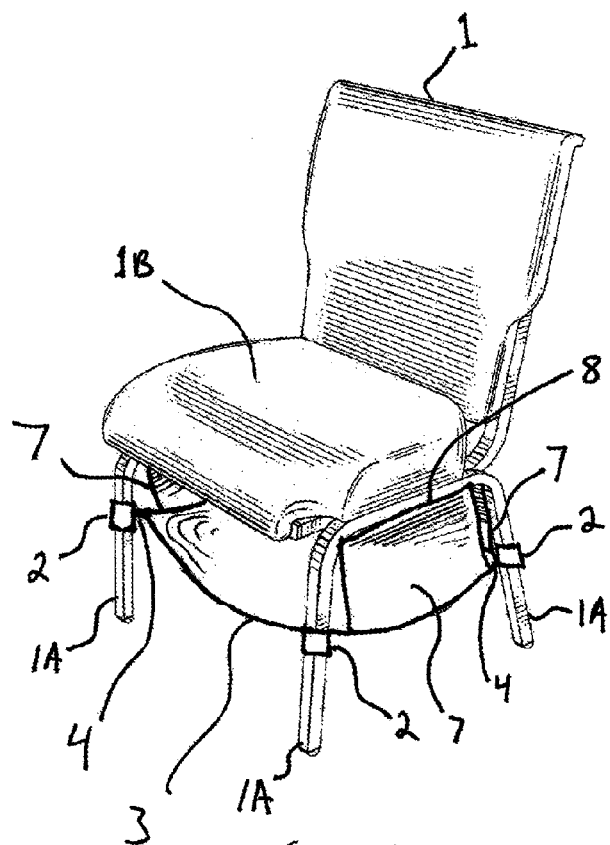
FIGS. 4A to 4C show the side flap configuration of the sheet of the present invention attached to a chair in different views.
Figure 4B:
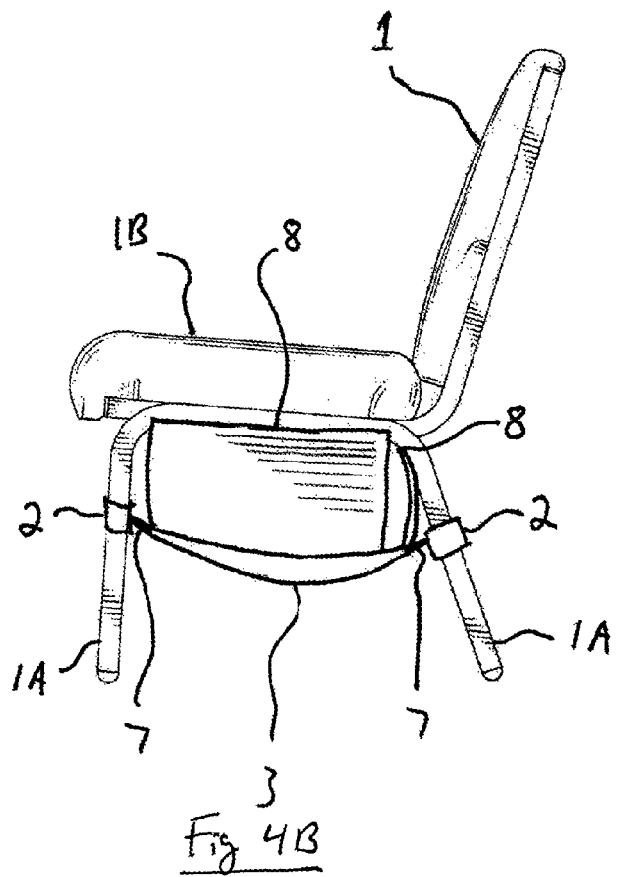
Figure 4C:
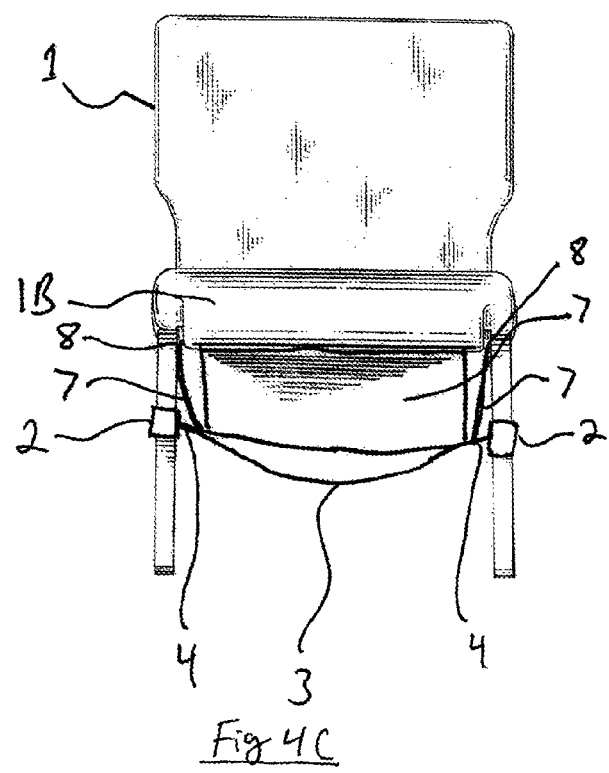

Another possible alternate design that utilizes side flaps is shown in FIG. 2C. This configuration utilizes side straps 7 attached to three sides of the seating area 3 at the strap interface area 9. These side flaps will provide more of an enclosed area for the pet to sit on the seating area 3 when in the installed configuration. The installed configuration is shown in FIG. 4A (isometric view), FIG. 4B (side view) and FIG. 4C (front view). Similar to FIG. 1A-1C, the strap 4 is attached to the chair leg 1A at the attachment point 2 by any of the following means: string, hook and loop connections, buttons, snaps, buckles, zipper, strap, magnets, hooks, or other similar devices. The side flaps 7 are attached to the chair at the flap attachment point 8 by any of the following means: string, hook and loop connections, buttons, snaps, buckles, zipper, strap, magnets, hooks, or other similar devices.

From the description above, a number of advantages of the pet sheet invention become evident:

(a) The simple construction of the sheet eliminates the need for any special support framework by utilizing the inherent frame created by a chair's legs. This eliminates a large cost requirement of typical pet sheets.

(b) The space normally wasted underneath a chair is utilized by this invention. Therefore, additional floor space will not be required to utilize a pet sheet in the home.

(c) The sheet can be removed from in its installed state on the chair or left in place for cleaning. For cleaning operations such as sweeping or vacuuming of the floor, the sheet can be left attached to the chair and not present an additional item to be moved as opposed to conventional styles of cat sheets. If desired, the sheet can be removed from the chair for simple cleaning of the fabric.

(d) By having a simple design not requiring any framework, the packaging and shipping of the sheet will be more economical for both the manufacturer and consumer.

(e) By providing a covered area for a cat to lie, a pet will be more likely to utilize this style of sheet as opposed to an "open air" design of a typical pet sheet without any overhead covering. Therefore, the consumer will be more satisfied with a sheet their pet uses compared to one that the cat does not use very often.

The manner in which the invention is installed is the same for any of the previously mentioned designs. The main seating area 3 of the sheet is placed underneath of the chair 1 and in between the four chair legs 1A. The seating area of the sheet is placed equidistant from all four legs resulting in an equal amount of sheet strap 4 to be available for attachment to the chair legs 1A at the attachment point 2. Each of the sheet straps 4 are then individually attached at the attachment point 2 to the chair legs 1A at a level below the chair seat 1B to allow sufficient access to the sheet by the pet.

The installation of the design utilizing the side flaps 7 will follow the previous installation instructions with the following addition: once the sheet straps 4 are attached to the chair legs 1A at the attachment point 2 each side flap 7 is installed to the chair at the flap attachment point 8.

Figure 5A:
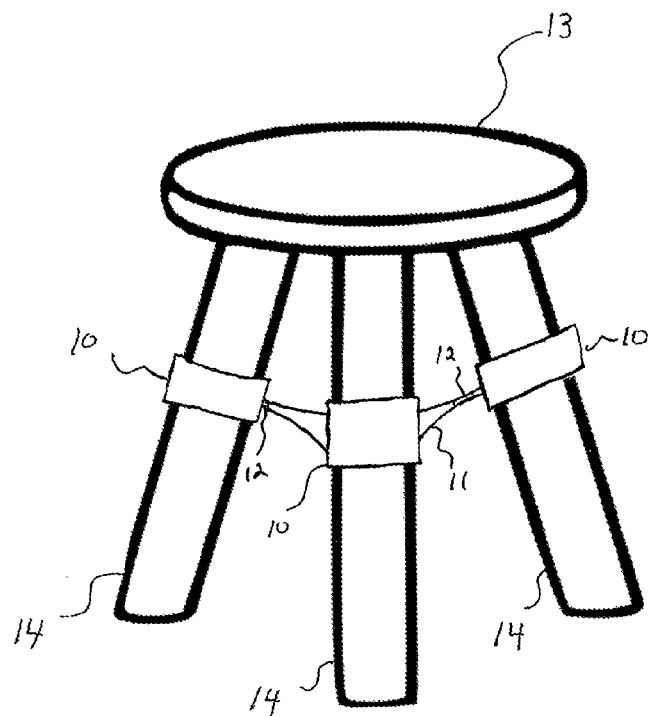
FIGS. 5A, 5B and 6 illustrate a sheet attached to a three legged chair indicating a front view, rear view and top view respectively.
Figure 5B:
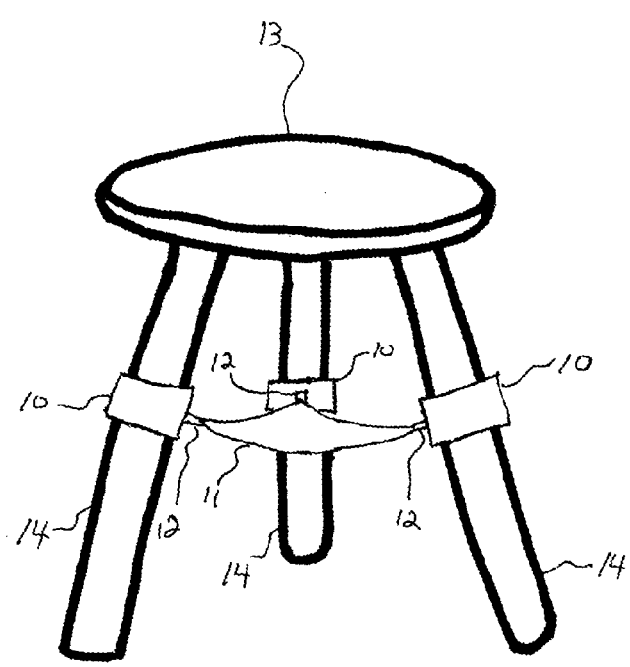
Figure 6:
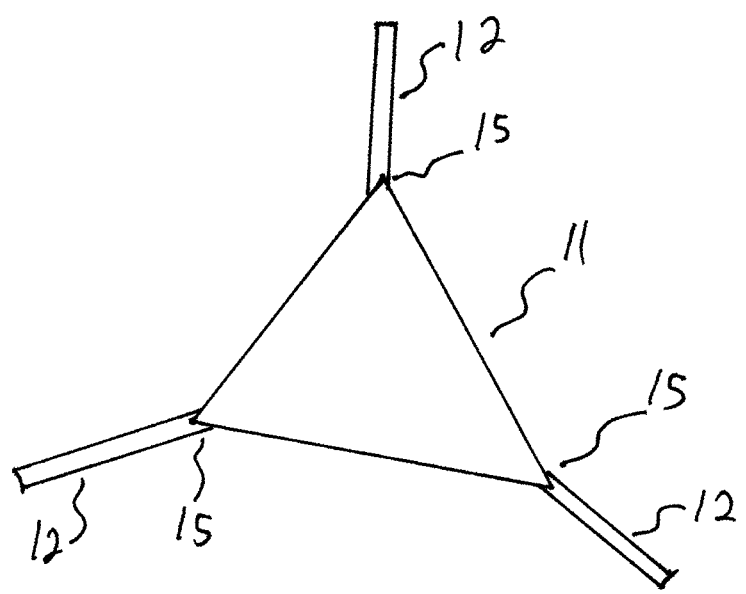

In an alternate embodiment shown in FIGS. 5A, 5B and 6, a sheet 11 attached to legs 14 of a three legged chair 13 using strap 12 and attachment patch 10 at interface point 15.

Accordingly, the reader will see that the configuration of this pet sheet invention will allow the user to save space in their home by using the wasted space underneath their existing chairs. Through the simple installation, the user will have the flexibility to use the sheet on virtually any type of chair with four legs. The cost will also be greatly reduced for both the manufacturer and consumer by eliminating the dedicated support structure of the sheet.

it eliminates the necessary dedicated support frame of the sheet, instead using chair legs for structural support.

it saves floor space by utilizing the wasted area underneath a chair it makes cleaning around the sheet easy since vacuums and brooms can reach underneath it easily and when the chair is moved for cleaning, the sheet moves with it.

it saves shipping costs by the elimination of the bulky and heavy support frame.

it increases consumer satisfaction by the pet's repeated use.

While the above description contains specifics, these should not be construed as limitations on the scope of the invention, but rather as an exemplification of one preferred embodiment thereof. Many other variations are possible, and a few were shown in the drawings. Variations such as the style, pattern, outline of the sheet straps and seating area were not mentioned or the manner in which the straps are attached both to the sheet seating area and to the chair. The straps themselves could be eliminated, thereby attaching the sheet seating area directly to the chair. This variation was not mentioned since the same end effect of creating a seating area for a pet attached to the chair legs would be achieved.

Accordingly, the scope of the invention should be determined not by the embodiments illustrated, but by the appended claims and their legal equivalents.

I claim:

1. A sheet for a chair underside, said chair comprising a seat having an area and an outer perimeter, a first leg, a second leg, a third leg, and a fourth leg said sheet comprising:
   an outer perimeter;
   a first strap having a first end, a second end, and a first fastener, said first end of the first strap being attached to a first attaching point of the sheet, said second end of the first strap being configured to wrap around the first leg of the chair and attach to itself via the first fastener;
   a second strap separate from the first strap and having a first end, a second end, and a second fastener, said first end of the second strap being attached to a second attaching point of the sheet said second end of the second strap being configured to wrap around the second leg of the chair and attach to itself via the second fastener;
   a third strap separate from the first and second straps and having a first end, a second end, and a third fastener, said first end of the third strap being attached to a third attaching point of the sheet said second end of the third strap being configured to wrap around the third leg of the chair and attach to itself via the third fastener; and
   a central area equidistant to each of the first, second and third attaching points; and
   wherein the central area comprises a bottommost portion of the sheet when the first, second, and third straps are wrapped around the first, second and third legs, respectively.

2. The sheet of claim 1 further comprising a fourth strap having a first end, a second end, and a fourth fastener, said first end of the fourth strap being attached to a fourth attaching point of the sheet, said second end of the fourth strap being configured to wrap around the fourth leg of the chair and attach to itself via the fourth fastener.

3. The sheet of claim 2, further comprising a stiffening bar coupled with a portion of the outer perimeter of the sheet disposed between the first strap and the second strap.

4. The sheet of claim 3, further comprising a stiffening bar coupled with a portion of the outer perimeter of the sheet disposed between the third strap and the fourth strap.

5. The sheet of claim 1, further comprising a first flap, said first flap having a bottom side and a top side, said bottom side of the first flap is being attached to a portion of the outer perimeter of the sheet disposed between the second strap and the third strap, said top side of the first flap being configured for attaching directly to a portion of the perimeter of the seat.

6. The sheet of claim 5, further comprising a second flap, said second flap having a bottom side and a top side, said bottom side of the second flap being attached to a portion of the outer perimeter of the sheet disposed between the first strap and the fourth strap, said top side of the second flap being configured for attaching directly to a portion of the perimeter of the seat.

7. The sheet of claim 1, wherein the sheet is made of a stretchable fabric.

8. A sheet for a chair underside, said chair comprising a seat having an area and an outer perimeter, a first leg, a second leg and a third leg, said sheet comprising:
   a triangular outer perimeter;
   a first strap having a first end, a second end, and a first fastener, said first end of the first strap being attached to a first attaching point of the sheet, said second end of the first strap being configured to wrap around the first leg of the chair and attach to itself via the first fastener;
   a second strap having a first end, a second end, and a second fastener, said first end of the second strap being attached to a second attaching point of the sheet said second end of the second strap being configured to wrap around the second leg of the chair and attach to itself via the second fastener;
   a third strap having a first end, a second end, and a third fastener, said first end of the third strap being attached to a third attaching point of the sheet said second end of the third strap being configured to wrap around the third leg of the chair and attach to itself via the third fastener.

9. The sheet of claim 8, wherein the sheet further comprises a central area equidistant to each of the first, second and third attaching points, and wherein the central area comprises the bottommost portion of the sheet when the first, second, and third straps are wrapped around the first, second and third legs, respectively.

10. The sheet of claim 8, further comprising a stiffening bar coupled with a portion of the outer perimeter of the sheet disposed between the first strap and the second strap.

11. The sheet of claim 8, wherein the sheet is made of a stretchable fabric.

12. A pet rest for a chair underside, said chair comprising a seat having an area and an outer perimeter, a first leg, and a second leg, said pet rest comprising:
   a flat sheet having an outer perimeter and an area;
   a first strap having a first end, a second end, and a first fastener, said first end of the first strap being attached to a first attaching point of the sheet, said second end of the first strap being configured to wrap around the first leg of the chair and attach to itself via the first fastener;
   a second strap having a first end, a second end, and a second fastener, said first end of the second strap being attached to a second attaching point of the sheet said second end of the second strap being configured to wrap around the second leg of the chair and attach to itself via the second fastener;

wherein the sheet comprises a central area equidistant to each of the first and second attaching points;

wherein the central area comprises a bottommost portion of the sheet when the first and second straps are wrapped around the first and second legs, respectively; and wherein the area of the flat sheet is less than or equal to the area of the seat.

13. The pet rest of claim 12, further comprising a stiffening bar coupled with a portion of the outer perimeter of the sheet disposed between the first strap and the second strap.

14. The pet rest of claim 12, further comprising a first flap, said first flap having a bottom side and a top side, said bottom side of the first flap is being attached to a portion of the outer perimeter of the sheet disposed between the second strap and the third strap, said top side of the first flap being configured for coupling directly to a first portion of the perimeter of the seat.

15. The pet rest of claim 12, further comprising a second flap, said second flap having a bottom side and a top side, said bottom side of the second flap being attached to a portion of the outer perimeter of the sheet disposed between the first strap and the second strap, said top side of the second flap being configured for attaching directly to a second portion of the perimeter of the seat.

16. The sheet of claim 12, wherein the sheet is made of a stretchable fabric.

* * * * *